UNITED STATES PATENT OFFICE.

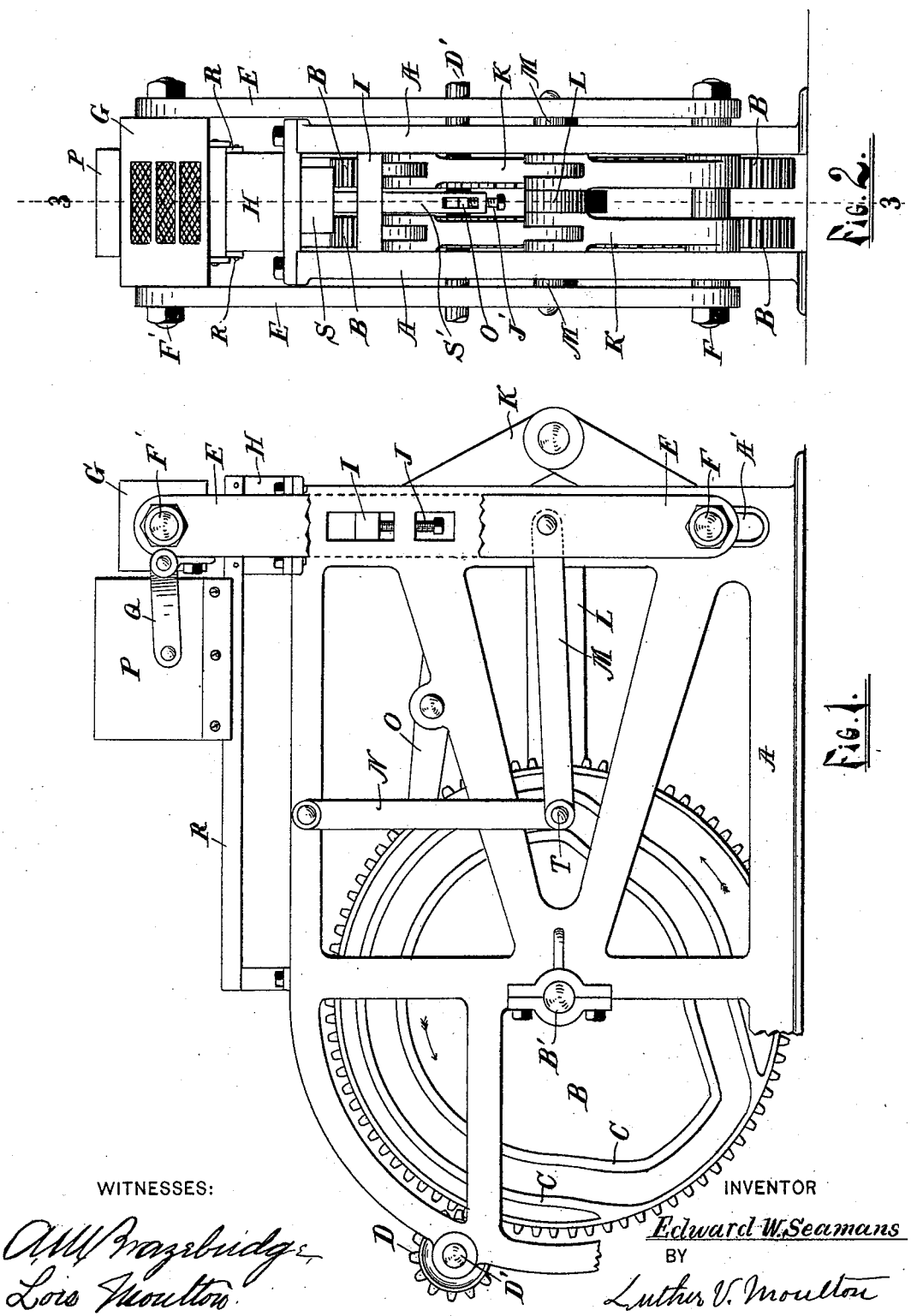

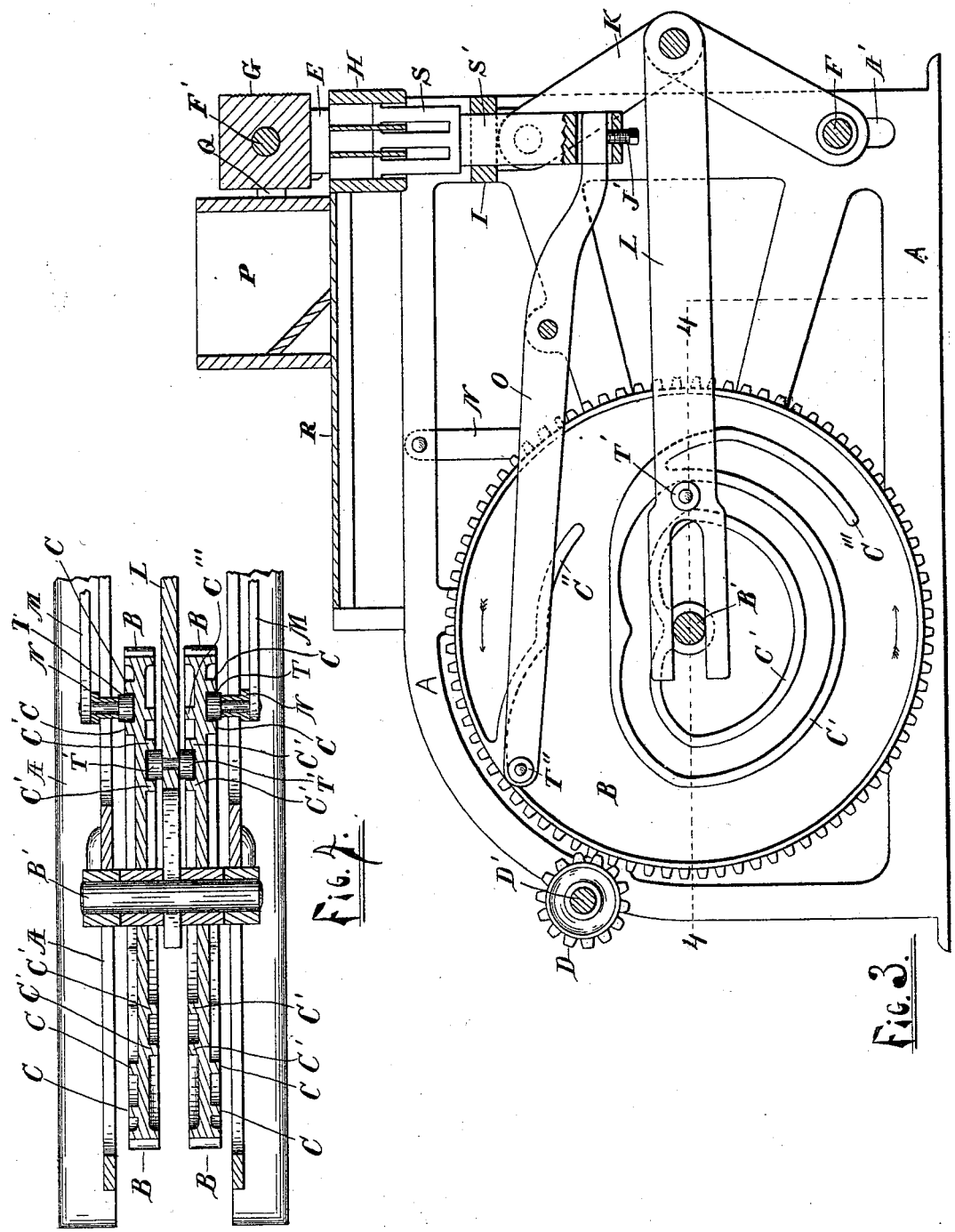

EDWARD W. SEAMANS, OF GRAND RAPIDS, MICHIGAN, ASSIGNOR OF ONE-HALF TO GEORGE C. BENTZ, OF SAME PLACE.

BRICK-PRESS.

SPECIFICATION forming part of Letters Patent No. 516,453, dated March 13, 1894.

Application filed October 2, 1893. Serial No. 487,050. (No model.)

*To all whom it may concern:*

Be it known that I, EDWARD W. SEAMANS, a citizen of the United States, residing at Grand Rapids, in the county of Kent and State of Michigan, have invented certain new and useful Improvements in Brick-Presses; and I do hereby declare the following to be a full, clear, and exact description of the invention, such as will enable others skilled in the art to which it appertains to make and use the same.

My invention relates to an improved brick press, and its object is to provide the same with certain new and useful features, hereinafter more fully described, and particularly pointed out in the claims, reference being had to the accompanying drawings, in which—

Figure 1 is a side elevation of a device embodying my invention; Fig. 2 a front elevation of the same; Fig. 3 a vertical section of the same on the line 3—3 of Fig. 2; and, Fig. 4 a horizontal section of a part of the same on the line 4—4 of Fig. 3.

Like letters refer to like parts in all of the figures.

A, A, represents the frame of the machine. B' is a shaft upon which are mounted two cam wheels B, B, having geared peripheries and rotated by pinions D, engaging said gears and fixed on a driving shaft D', rotated by any suitable means. Said wheels B are of equal diameter, arranged in parallel planes a short distance apart, and provided on their outer sides with cam ribs C, C, between which ribs are rolls T, T, (Fig. 4) journaled on a pin, which pivotally connects the respective ends of the vertical rods N (which rods are pivoted at their upper ends to the frame) and the horizontal rods M, which latter are pivoted at their outer ends to the bars E, E, which bars are connected at their lower ends by a heavy bolt F, and at their upper ends by a similar bolt F'. The lower bolt F passes through vertically elongated openings A' in the frame and is vertically movable therein, the upper bolt F' passes through the axis of a square head G, which head may be adjusted to bring any one of its faces above the mold H by slacking said bolt and turning said head thereon and again tightening the bolt.

H is a mold for forming the bricks, open at the top and bottom and secured to the frame between the bars E, E. The upper side of this mold is closed by the head G, and the lower side thereof is closed by a vertically movable ram S, provided with a reduced extension S', which latter passes through an opening in a cross head I, said cross head being vertically movable in ways in the frame, and moved by the knuckle-joint levers K, pivoted to said cross head at their upper ends. Said levers are pivoted on the bolt F at their lower ends and at the middle to the end of the operating bar L, which bar is forked at the inner end and embraces the shaft B', being longitudinally movable thereon, and actuated by rolls T', T' journaled on said bar and engaging cam ribs C', C', C', C', on the adjacent faces of the wheels B, B. A lever O is intermediately pivoted to the frame, having one end inserted in an opening in the extension S' of the ram, and the other end passing between the wheels B, B, and provided with rolls T'' to engage cam ribs C'', C''', on said wheels. Adjustable set screws J limit the downward movement of the cross-head I, and a similar screw J' limits the downward movement of the lever O in the opening in the extension S'.

At the rear of the mold H is a table R, the upper surfaces of which mold and table are in the same horizontal plane, and arranged to slide thereon is a box P open at the top and bottom into which is fed by any convenient means the material of which the bricks are made; said box is connected to the bars E and moved thereby by means of rods Q pivoted at their respective ends to each.

The mold H is divided into suitable compartments to form a number of bricks at once, and the ram correspondingly divided at its upper end, and the head G has suitable indented designs to mold the edge of the bricks, which designs are successively brought into use by turning the head as described.

The operation of my device is as follows:
The rods N support the inner ends of the rods M and the rolls T, and permit the same to move toward and from the shaft B' as said rolls traverse the cam ribs C, C. The bar L is supported by the shaft B' and permitted to move longitudinally as the rolls T' traverse the cam ribs C', C'. By virtue of the forms of the various cams as shown, the following movements will take place as the wheels B revolve in the direction of the arrows. The bars E, E, swing inward at their upper ends, moving the head G backward and uncovering the molds. During and subsequent to this movement the cam C″ moves the end of the lever O down, thus raising its opposite end and lifting the ram S to the top of the mold H, discharging the pressed bricks, which may be removed in any convenient way. The cam C‴ now moves the lever O back to its normal position, thus lowering the ram S to a point determined by adjusting the screw J′, the quantity of material deposited in the mold being thus determined by the position of the ram in the molds. During and subsequent to this return movement of the ram, the bars E, are moved outward at their upper ends by the cam C, C, carrying the head outward far enough to bring the box P over the molds to permit its contents to flow into and fill the same. The bars E then move back to the vertical position and remain thus during the pressing operation. Thus far the pressing mechanism has been stationary, the rolls T′ having been traversing the portion of the cam ribs C′ concentric to the shaft. At this point about one-half of a revolution has been made by the wheels B, B. The rolls T′ are next carried toward the shaft B′ and the middle joint of the levers K drawn inward, this first lowers the bolt F in the opening A′ and carries the bars and head G downward until said head rests on the mold H, then the cross head I rises and carrying with it the ram S compresses the contents of the mold. It will be observed that the strain of this pressure falls entirely on these side bars, E, E, and in line with their length, and also that as the pressure increases the cam rib C′ approaches the axis of the wheel B, thus increasing the leverage. The bar L now moves outward restoring the knuckle joint lever to the position shown, thus first lowering the cross head upon the screws J, which are adjusted to permit said cross head to move out of the way of the ram S as it descends, and finally the bolt F rises to place thus lifting the head G off the mold, preparatory to repeating the described operations; in the mean time the levers N and O, have remained stationary during the last half revolution of the wheel B, B.

What I claim is—

1. In a brick press, a mold open at the top and bottom, a head to close the top of said mold, a movable ram within said mold a knuckle-joint lever operating said ram, a vertically movable bolt to which said lever is pivoted at its lower end, bars connecting said bolt and head, rods pivoted to said bars and a longitudinally movable bar pivoted to the middle joint of the lever, rolls on said rods and bar, wheels having cam ribs engaging said rolls, and means for rotating said wheels, substantially as described.

2. In a brick press, a mold open at the top and bottom, a movable head to close the top of the mold, a vertically movable ram in said mold, a cross-head to operate said ram, set screws to limit the downward movement of said cross-head, a vertically movable bolt, a knuckle-joint lever connected at its ends to said bolt and cross-head, bars connecting said bolt and movable head, rods pivoted to said bars, rolls on said rods, a bar pivoted to the middle joint of said lever, rolls on said bar, a pivoted lever engaging said ram, rolls on said lever, and wheels having cam ribs engaging all of said rolls, substantially as described.

3. In a brick press, the combination with a mold, and a head, movable both vertically above and to and horizontally over the top of said mold, of a box, having a discharge opening in its bottom, and pivoted rods, connecting said head and box together.

4. In a brick press, the combination with a mold, and a table, having its top in the plane of the top of said mold, of a head, a box, having a discharge opening in its bottom, pivoted rods, connecting said head and box together, and bars for moving said head horizontally over and vertically above and to the top of said mold, substantially as shown and described.

5. In a brick press, a mold, a ram movable in the mold, a head movable both horizontally and vertically, said head having a plurality of equal sides each provided with an indented design, bars supporting and holding said head, a bolt passing through said bars and head and serving to secure them together so that any one of the faces of the head may be adjusted into operative position, and a box movable with said head and having a discharge opening in its bottom, substantially as described.

6. In a brick press, a mold, a ram movable in the same, a cross-head to actuate said ram, and detached from the ram and having an opening, an extension on said ram passing through said opening and movable therein, mechanism for operating the cross-head, and a pivoted lever engaging said extension at one end and having a roll at the other, and a wheel having cam ribs engaging said roll, substantially as described.

7. In a brick press, a mold, a movable head to close said mold, a vertically movable bolt, bars connecting said bolt and head and adapted to oscillate at their upper ends, a table having its surface in the plane of the top of said molds, a box open at the bottom traversing said table and molds, and attached to the bars, rods, M, pivoted to said bars, pivotally supported rods, N, pivoted to said rods, M, rolls on said rods, and wheels having cam ribs engaging said rolls, whereby said head is moved back over the table to release the pressed bricks, and then moved forward to bring the box over the mold, and then moved to place over the molds, substantially as described.

8. In a brick machine, in combination with a mold, a movable head, a ram, pivoted bars E, supporting the head, a lever K, to operate the ram, a longitudinally movable bar L, pivoted to said lever, rods M, pivoted to said bars E, a pivoted lever O, engaging the ram, rolls on said bar L, rods M, and lever O; and wheels having cam ribs engaging said rolls substantially as described.

In testimony whereof I affix my signature in presence of two witnesses.

EDWARD W. SEAMANS.

Witnesses:
 LUTHER V. MOULTON,
 LEWIS E. FLANDERS.